US006653402B2

(12) United States Patent
Ichikawa et al.

(10) Patent No.: US 6,653,402 B2
(45) Date of Patent: Nov. 25, 2003

(54) GOLF BALL

(75) Inventors: Yasushi Ichikawa, Chichibu (JP); Yoko Furuta, Nagoya (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 0 days.

(21) Appl. No.: 10/152,787

(22) Filed: May 23, 2002

(65) Prior Publication Data

US 2003/0083435 A1 May 1, 2003

(30) Foreign Application Priority Data

May 30, 2001 (JP) ........................................ 2001-163336

(51) Int. Cl.[7] ........................... A63B 37/00; C08L 67/02
(52) U.S. Cl. ............................ 525/71; 525/74; 525/90; 525/91; 525/92 A; 473/373; 473/374
(58) Field of Search ............................. 525/71, 74, 90, 525/91, 92 A; 473/373, 374

(56) References Cited

U.S. PATENT DOCUMENTS

| 4,337,947 A | 7/1982 | Saito et al. | |
|---|---|---|---|
| 4,919,434 A | 4/1990 | Saito | |
| 5,556,098 A | 9/1996 | Higuchi et al. | |
| 6,579,939 B2 * | 6/2003 | Ichikawa et al. | ............. 525/89 |

FOREIGN PATENT DOCUMENTS

| JP | 07-024084 A | 1/1995 |
|---|---|---|
| JP | 09-176429 A | 7/1997 |
| JP | 10-147690 A | 6/1998 |
| WO | WO 92/12206 | 7/1992 |

* cited by examiner

*Primary Examiner*—David J. Buttner
(74) *Attorney, Agent, or Firm*—Sughrue Mion, PLLC

(57) ABSTRACT

A golf ball comprising a part of a resin composition comprising (A) a polyester block copolymer, (B) an ionomer resin, (C) a polyester-aromatic vinyl copolymer block copolymer and (D) an epoxy-modified graft polymer comprising an olefin polymer backbone and vinyl polymer pendants wherein components (C) and (D) help to mix components (A) and (B) in a more compatible manner is provided. The resin composition has flexibility, high resilience, toughness, flexural fatigue resistance and tear strength, exhibits a sufficiently smooth flow in the melt to injection mold, and develops no delamination when molded, and the golf ball offers increased distance and pleasant feel upon impact and is endowed with superior durability.

15 Claims, No Drawings

GOLF BALL

This invention relates to a golf ball manufactured using a resin composition which has flexibility, resilience, toughness, flexural fatigue resistance and tear strength, exhibits a sufficiently smooth flow in the melt to injection mold, and produces a delamination resistant molded part, the golf ball featuring increased distance, pleasant feel upon impact and improved durability.

BACKGROUND OF THE INVENTION

Polyester block copolymers comprising hard segments composed of crystalline aromatic polyester units such as polybutylene terephthalate units and soft segments composed of aliphatic polyether units such as poly(alkylene oxide) glycol and/or aliphatic polyester units such as polylactone have satisfactory mechanical properties including strength, impact resistance, elastic recovery and flexibility, as well as low- and high-temperature properties, and are thermoplastic and easy to mold. These copolymers are of great interest in the golf art as the ball-forming resin composition as disclosed in JP-A 7-24084.

Despite such satisfactory physical properties, polyester block copolymers tend to lower mechanical properties such as modulus of resilience, strength and impact resistance and low-temperature properties as their hardness increases. Further improvements in physical properties are desired in order to increase the distance of golf balls manufactured using these copolymers.

On the other hand, ionomer resins in the form of copolymers of α-olefin with α,β-unsaturated carboxylic acids, neutralized with mono- to trivalent metal ions, are thermoplastic and easy to mold. The ionomer resins are very tough and fully resistant to rupture even when undergoing substantial deformation at a high speed. This feature is very advantageous in improving the scuff resistance and durability against repetitive hits of golf balls. Because of this feature, ionomer resins have long been used as the cover stock for golf balls.

However, ionomer resins are short of flexibility, giving a hard feel upon impact. It was then proposed to use in the golf ball-forming resin composition, softened ionomer resins in the form of copolymers of α-olefin, α,β-unsaturated carboxylic acids, and α,β-unsaturated carboxylic esters, neutralized with mono- to trivalent metal ions. The softened ionomer resins, however, are inferior in resilience and low-temperature properties. Improvements in these properties are thus desired.

A further attempt was made to prepare golf balls from resin compositions in which polyester block copolymers are mixed with ionomer resins to compensate for the drawbacks of the respective components. For example, JP-A 56-83367 and JP-A 62-275480 disclose golf balls using resin compositions comprising polyester block copolymers in admixture with ionomer resins. Since polyester block copolymers having flexibility and resilience are mixed with ionomer resins having toughness and modulus of resilience though lacking flexibility, the resulting mixtures make use of the advantages of the respective components and are effective for improving rebound performance.

However, since polyester block copolymers and ionomer resins are not so compatible when mixed together, the golf ball-forming resin compositions proposed in the above patent references have uneven morphology. They suffer from the problem that since the respective resins are readily oriented during injection molding, the molded parts are likely to delaminate and less durable against repetitive hits.

Attempts have been made to further ameliorate these resin compositions. For example, WO 92/12206 discloses that a resin composition comprising a polyester block copolymer, an ionomer resin and an epoxy-containing compound is useful to form the golf ball core. JP-A 9-176429 discloses a golf ball using a resin composition comprising a polyester block copolymer, an ionomer resin and an epoxidized diene block copolymer. Since the resin compositions in these two patent references are formulated so as to improve the compatibility between the polyester block copolymer and the ionomer resin, they are golf ball-forming resin compositions having improved delamination resistance, flexibility and modulus of resilience. The inclusion of such epoxy-containing copolymers, however, increases the melt viscosity of the resin compositions. A high viscosity is advantageous for extrusion molding and blow molding, but inadequate for injection molding. The resin compositions are thus rather disadvantageous in molding golf balls.

Moreover, JP-A 10-147690 discloses that a thermoplastic polymer composition comprising a polyester resin, an addition polymerization type block copolymer, a polyester block copolymer and an ionomer resin is useful to form the golf ball cover. This thermoplastic polymer composition is a hard material having a high tensile strength and flexural strength and a very high flexural rigidity, but not a material having flexibility and a high modulus of resilience like rubber. The durability against hits of the composition is insufficient as the golf ball cover. Therefore, the composition is far apart from the desired golf ball material.

As discussed above, a golf ball-forming resin composition has not been available thus far which has flexibility, resilience, toughness, flexural fatigue resistance and tear strength, exhibits a sufficiently smooth flow in the melt to injection mold, and produces a delamination resistant molded part.

SUMMARY OF THE INVENTION

An object of the present invention is to provide a golf ball which is manufactured using a resin composition which has flexibility, high resilience, toughness, flexural fatigue resistance and tear strength, exhibits a sufficiently smooth flow in the melt to injection mold, and produces a delamination resistant molded part, so that the golf ball may offer increased distance, pleasant feel upon impact and improved durability.

It has been found that a resin composition capable of meeting the above requirements is obtained by blending specific amounts of (A) a polyester block copolymer, (B) an ionomer resin, (C) a copolymer and (D) an epoxy-modified graft polymer as essential components. Since the polyester block copolymer (A) and the ionomer resin (B) can be mixed in a well compatible manner, the composition exhibits a smooth flow when melted and is thus suited for injection molding. Both the advantages of the polyester block copolymer (A) including good mechanical properties such as strength, impact resistance, elastic recovery and flexibility and good low- and high-temperature properties, thermoplasticity and ease of molding, and the advantages of the ionomer resin (B) including thermoplasticity, ease of molding, toughness, and rupture resistance (even when undergoing a substantial deformation at a high speed) are combined in a good balance so that the composition is endowed with not only improved durability-related properties such as rupture strength and impact strength, but also rubbery properties such as adequate flexibility and high resilience. Molded parts of the composition are markedly improved in durability (e.g., flexural fatigue resistance) and tear strength, and unsusceptible to cleavage or delamination.

It has also been found that a golf ball comprising a hot molded part of the above resin composition as its constituent component is improved in distance, feel and durability. A multi-piece solid golf ball comprising an intermediate layer formed of the above resin composition is endowed with excellent properties of both components (A) and (B) so that the ball is improved in distance and feel and remains highly durable.

According to the invention, there is provided a golf ball comprising as a constituent component a hot molded part of a resin composition comprising (A) 5 to 95% by weight of a polyester block copolymer comprising as main constituents (a1) high melting, crystalline polymer segments composed of crystalline aromatic polyester units and (a2) low melting polymer segments composed of aliphatic polyether units and/or aliphatic polyester units, (B) 95 to 5% by weight of an ionomer resin in the form of a copolymer comprising as main constituents (b1) an α-olefin and (b2) an α,β-unsaturated carboxylic acid having 3 to 8 carbon atoms, which is neutralized with (b3) at least one metal ion selected from among mono- to trivalent metal ions, the amount of components (A) and (B) combined being 100 parts by weight, (C) 1 to 40 parts by weight of a polyester-aromatic vinyl copolymer block copolymer comprising (c1) blocks of polyester and (c2) blocks of at least one type selected from among a block copolymer of an aromatic vinyl monomer with a conjugated diene, a random copolymer of an aromatic vinyl monomer with a conjugated diene, and hydrogenated products of these copolymers, and (D) 0.01 to 10 parts by weight of an epoxy-modified graft polymer comprising an olefin polymer backbone and vinyl polymer pendants.

In a preferred embodiment, the high melting, crystalline polymer segments (a1) are composed mainly of polybutylene terephthalate units; the low melting polymer segments (a2) are composed mainly of poly(tetramethylene oxide) glycol units. Also preferably, the low melting polymer segments (a2) are copolymerized in an amount of 15 to 90% by weight, and more preferably 50 to 90% by weight of component (A).

In a preferred embodiment, component (B) is an ionomer resin in the form of a copolymer comprising as main constituents (b1) an α-olefin, (b2) an α,β-unsaturated carboxylic acid having 3 to 8 carbon atoms, and (b4) an acrylate and/or methacrylate, which is neutralized with (b3) at least one metal ion selected from among mono- to trivalent metal ions. Further preferably, component (B) comprises at least two ionomer resins neutralized with different metal ions.

Preferably, the polyester (c1) is an aromatic polyester and more preferably polybutylene terephthalate, and the copolymer (c2) is at least one member selected from among a styrene-butadiene block copolymer, a styrene-isoprene block copolymer, and hydrogenated products of these copolymers.

Preferably, the epoxy-modified graft polymer (D) is a polymer modified with glycidyl methacrylate.

In a preferred embodiment, the polyester block copolymer (A) has a flexural rigidity of 5 to 250 MPa as measured according to JIS K-7106, and the ionomer resin (B) has a flexural rigidity of 25 to 500 MPa as measured according to JIS K-7106; the copolymer (A) and the ionomer resin (B) have Shore D hardnesses as measured according to ASTM D-2240, the difference, expressed as the hardness of ionomer resin (B)—the hardness of copolymer (A), is at least 10 units.

In a further preferred embodiment, the molded part has a Shore D hardness of 25 to 70 as measured according to ASTM D-2240 and/or a modulus of resilience of 40 to 90% as measured according to British Standard Specification 903.

A preferred embodiment is a multi-piece solid golf ball comprising a core, an intermediate layer, and a cover wherein the intermediate layer is formed of the resin composition.

DESCRIPTION OF THE PREFERRED EMBODIMENTS

The golf ball of the present invention includes as a constituent component a hot molded part of a resin composition comprising (A) a polyester block copolymer, (B) an ionomer resin, (C) a copolymer and (D) an epoxy-modified graft polymer as essential components.

The polyester block copolymer (A) includes as main constituents (a1) high melting, crystalline polymer segments composed of crystalline aromatic polyester units and (a2) low melting polymer segments composed of aliphatic polyether units and/or aliphatic polyester units.

Component (a1) is preferably polybutylene terephthalate derived from terephthalic acid and/or dimethyl terephthalate and 1,4-butane diol. Also included are polyesters derived from dicarboxylic acid components such as isophthalic acid, phthalic acid, naphthalene-2,6-dicarboxylic acid, naphthalene-2,7-dicarboxylic acid, diphenyl-4,4'-dicarboxylic acid, diphenoxyethane dicarboxylic acid, 5-sulfoisophthalic acid and ester-forming derivatives thereof; and diols having a molecular weight of not more than 300, for example, aliphatic diols such as ethylene glycol, trimethylene glycol, pentamethylene glycol, hexamethylene glycol, neopentyl glycol and decamethylene glycol, alicyclic diols such as 1,4-cyclohexane dimethanol and tricyclodecane dimethylol, and aromatic diols such as xylylene glycol, bis(p-hydroxy)diphenyl, bis(p-hydroxyphenyl)propane, 2,2-bis[4-(2-hydroxyethoxy)phenyl]propane, bis[4-(2-hydroxy)phenyl]-sulfone, 1,1-bis[4-(2-hydroxyethoxy)phenyl]cyclohexane, 4,4'-dihydroxy-p-terphenyl, and 4,4'-dihydroxy-p-quaterphenyl, as well as copolymerized polyesters using two or more of the foregoing dicarboxylic acid and/or two or more of the diol components. Also useful are copolymerized polyesters in which the foregoing components are copolymerized with not more than 5 mol % of polyfunctional (trifunctional or more) carboxylic acid components, polyfunctional oxy-acid components, or polyfunctional hydroxy components.

Component (a2) is a low melting polymer segment composed of aliphatic polyether units and/or aliphatic polyester units. Examples of suitable aliphatic polyethers include poly(ethylene oxide) glycol, poly(propylene oxide) glycol, poly(tetramethylene oxide) glycol, poly(hexamethylene oxide) glycol, copolymers of ethylene oxide and propylene oxide, ethylene oxide-added polymers of poly(propylene oxide) glycol, and copolymers of ethylene oxide and tetrahydrofuran.

Examples of suitable aliphatic polyesters include poly(ε-caprolactone), polyenantholactone, polycaprylo-lactone, polybutylene adipate and polyethylene adipate.

As component (a2), poly(tetramethylene oxide) glycol, ethylene oxide-added polymers of poly(propylene oxide)

glycol, poly(ε-caprolactone), polybutylene adipate and polyethylene adipate are preferred for the elastic properties of the resulting polyester block copolymers. Of these, poly(tetramethylene oxide) glycol is most preferred.

These low melting polymer segments preferably have a number average molecular weight of about 300 to 6,000 in the copolymerized state.

In component (A), component (a2) is preferably used in an amount of at least 15%, especially at least 50% by weight, and up to 90% by weight, provided that the total amount of components (a1) and (a2) copolymerized is 100% by weight. If the proportion of component (a2) is above the range, there is a possibility that melt properties suitable for injection molding are lost, melt blending becomes difficult, and uniform mixing becomes difficult. If the proportion of component (a2) is below the range, sufficient flexibility and resilience may be sometimes lost.

Component (A) is a copolymer composed mainly of above components (a1) and (a2). The preparation method is not critical and any well-known method may be used. Exemplary are the following methods (1) to (5), any of which is advantageously used.
(1) Ester interchange reaction is carried out among a lower alcohol diester of dicarboxylic acid, an excess of a low molecular weight glycol and a low melting polymer segment component in the presence of a catalyst, and the reaction product is polycondensed.
(2) Esterification reaction is carried out among a dicarboxylic acid, an excess of a glycol and a low melting polymer segment component in the presence of a catalyst, and the reaction product is polycondensed.
(3) A high melting crystalline segment is previously prepared, a low melting segment component is added thereto, and ester interchange reaction is effected therebetween to form a random copolymer.
(4) A high melting crystalline segment and a low melting polymer segment are bound together using a concatenating agent.
(5) When poly(ε-caprolactone) is used as the low melting polymer segment, addition reaction of ε-caprolactone monomer to a high melting crystalline segment is carried out.

It is recommended that the polyester block copolymer (A) have a Shore D hardness of at least 10, preferably at least 25 and up to 55, especially up to 50, as measured according to ASTM D-2240. Preferably the polyester block copolymer (A) is softer than the ionomer resin (B) to be described later.

Component (A) preferably has a high modulus of resilience, typically of at least 40%, more preferably at least 50% and up to 90%, as measured according to British Standard Specification 903. If the modulus of resilience of component (A) is too low, a molded part of the resin composition may sometimes become less resilient, with a golf ball comprising the molded part becoming degraded in flight performance.

Additionally, component (A) preferably has a relatively low flexural rigidity, typically of at least 5 MPa, more preferably at least 10 MPa, even more preferably at least 15 MPa, and up to 250 MPa, more preferably up to 200 MPa, even more preferably up to 150 MPa, as measured according to JIS K-7106. If the flexural rigidity of component (A) is too high, a molded part of the resin composition may sometimes become too rigid, with a golf ball comprising the molded part becoming degraded in feel and durability.

Component (B) is an ionomer resin in the form of a copolymer comprising as main constituents (b1) an α-olefin and (b2) an α,β-unsaturated carboxylic acid having 3 to 8 carbon atoms, which is neutralized with (b3) at least one metal ion selected from among mono- to trivalent metal ions.

Examples of the α-olefin (b1) are ethylene, propylene, and butene-1. Of these, ethylene is most preferred.

Examples of the α,β-unsaturated carboxylic acid having 3 to 8 carbon atoms (b2) include acrylic acid, methacrylic acid, ethacrylic acid, itaconic acid, and maleic acid. Of these, acrylic acid and methacrylic acid are preferably used.

While the copolymer (B) is composed mainly of the α-olefin (b1) and the α,β-unsaturated carboxylic acid (b2), the copolymer optionally includes (b4) an acrylate and/or methacrylate as another main constituent whereby more flexibility is imparted.

Examples of the acrylate or methacrylate (b4) include methyl acrylate, ethyl acrylate, isobutyl acrylate, n-butyl acrylate, 2-ethylhexyl acrylate, methyl methacrylate, n-butyl methacrylate and isobutyl methacrylate. Of these, methyl acrylate, ethyl acrylate and n-butyl acrylate are preferred.

It is recommended for the copolymer (B) that the proportion of α,β-unsaturated carboxylic acid (b2) be at least 0.2 mol %, especially at least 5 mol %, and up to 25 mol %, especially up to 15 mol % of the copolymer, regardless of whether or not optional component (b4) is included. Too less a proportion of α,β-unsaturated carboxylic acid may lead to a lower rigidity and restitution, sometimes detracting from the flight performance of the golf ball.

The ionomer resin (B) is obtained by neutralizing the copolymer of above components (b1), (b2) and optional (b4) with (b3) at least one metal ion selected from among mono- to trivalent metal ions. Mono- to trivalent metal ions suitable for neutralization are, for example, sodium, potassium, lithium, magnesium, calcium, zinc, aluminum, ferrous and ferric ions.

To introduce such metal ions into the copolymer of above components (b1), (b2) and optional (b4), the copolymer may be reacted with any of hydroxides, methoxides, ethoxides, carbonates, nitrates, formates, acetates and oxides of mono- to trivalent metals. The preferred degree of neutralization is such that at least 10 mol %, especially at least 30 mol % and up to 100 mol %, especially up to 90 mol % of carboxyl groups in the copolymer are neutralized with metal ions. A lower degree of neutralization may lead to low resilience.

Commercial ionomer resins may be used as the ionomer resin (B). Illustrative examples include Himilan 1554, 1557, 1601, 1605, 1706, 1855, 1856, AM7315, AM7316, AM7317 and AM7318 (all products of DuPont-Mitsui Polychemicals Co., Ltd.), as well as Surlyn 6320, 7930, 8120, 8945 and 9945 (all products of E.I. du Pont de Nemours).

As component (B), an ionomer resin neutralized with one metal ion may be blended alone although it is preferred to blend a mixture of ionomer resins neutralized with different metal ions. Where commercially available products as mentioned above are used, for example, it is recommended to use two or more ionomer resins of different ion types in combination. The combined use is effective for further improving the balance of flow upon melting, flexural fatigue resistance, tear strength and resilience so that the resin composition may become more suited for the preparation of golf balls. Typical combinations of different ion types are combinations of sodium and zinc ion-neutralized type ionomer resins.

It is recommended that the ionomer resin (B) have a Shore D hardness of at least 45, preferably at least 55, more preferably at least 60 and up to 80, preferably up to 75, more preferably up to 70, as measured according to ASTM D-2240. Preferably the hardness of component (B) is higher than that of component (A).

Also, component (B) preferably has a flexural rigidity of at least 25 MPa, more preferably at least 50 MPa, even more preferably at least 200 MPa, and up to 500 MPa, more preferably up to 450 MPa, even more preferably up to 400 MPa, as measured according to JIS K-7106. Preferably the flexural rigidity of component (B) is higher than that of component (A).

In the golf ball-forming resin composition according to the invention, specific amounts of components (C) and (D) to be described below are blended per 100 parts by weight of the above components (A) and (B) combined. With respect to the mixing proportion of components (A) and (B), provided that the total of components (A) and (B) is 100% by weight, component (A) is blended in an amount of at least 5%, preferably at least 10%, more preferably 20% by weight and up to 95%, preferably up to 90%, more preferably up to 80% by weight whereas component (B) is blended in an amount of up to 95%, preferably up to 90%, more preferably up to 80% by weight and at least 5%, preferably at least 10%, more preferably at least 20% by weight. Outside the range, the performance factors of the golf ball including feel, durability and flight performance degrade.

In this blending stage, from the standpoint of enhancing the modulus of resilience, low-temperature properties and mechanical strength of the resin composition, it is recommended to select a polyester block copolymer having a low flexural rigidity, low surface hardness and high modulus of resilience as component (A) and an ionomer resin having a high flexural rigidity and high surface hardness as component (B) and mix them.

In blending components (A) and (B), it is preferred to adjust the surface hardness of them. Typically, the difference of Shore D hardness, expressed as the hardness of component (B)—the hardness of component (A), is at least 10 units, preferably at least 20 units, more preferably at least 30 units. By selecting components (A) and (B) which satisfy the hardness difference and mixing them, it becomes possible to take more advantage of components (A) and (B). The upper limit of surface hardness difference is preferably up to 50.

In the blending stage, it is also recommended to blend components (A) and (B) such that the difference of flexural rigidity, expressed as the flexural rigidity of component (B)—the flexural rigidity of component (A), is at least 100 MPa, preferably at least 150 MPa, more preferably at least 200 MPa. A smaller flexural rigidity difference may lead to an insufficient improvement in restitution.

According to the invention, (C) a polyester-aromatic vinyl copolymer block copolymer is blended as an essential component. This copolymer is obtained by reacting (c1) blocks of polyester with (c2) blocks of at least one type selected from among a block copolymer of an aromatic vinyl monomer with a conjugated diene, a random copolymer of an aromatic vinyl monomer with a conjugated diene, and hydrogenated products of these copolymers.

Examples of suitable polyester (c1) include polyethylene terephthalate, polybutylene terephthalate, polyethylene naphthalate, polybutylene naphthalate, poly-1,4-cyclohexane dimethylene terephthalate, polycaprolactone, and polybutylene adipate. Of these, aromatic polyesters are preferred, with polybutylene terephthalate being especially preferred.

In component (c2), examples of suitable aromatic vinyl monomers include styrene, α-methylstyrene, vinyltoluene, p-methylstyrene, p-t-butylstyrene, o-ethylstyrene, o-dichlorostyrene, and p-dichlorostyrene. Examples of suitable conjugated dienes include 1,3-butadiene, isoprene, 2,3-dimethyl-1,3-butadiene, 1,3-pentadiene, 2-methyl-1,3-pentadiene, 1,3-hexadiene, 4,5-diethyl-1,3-octadiene, 3-butyl-1,3-octadiene and chloroprene.

Preferred examples of component (c2) are block copolymers of styrene and butadiene (especially 1,3-butadiene) or isoprene, random copolymers of styrene and butadiene (especially 1,3-butadiene) or isoprene, and hydrogenated products of these copolymers.

As indicated above, the polyester-aromatic vinyl copolymer block copolymer (C) is a block copolymer obtained by copolymerizing (c1) blocks of polyester with (c2) blocks of at least one type selected from among a block copolymer of an aromatic vinyl monomer with a conjugated diene, a random copolymer thereof, and hydrogenated products of these copolymers. Preferably, component (c1) is blocks of an aromatic polyester, especially polybutylene terephthalate, and component (c2) is blocks of at least one type selected from among styrene-butadiene block copolymers, styrene-isoprene block copolymers, styrene-butadiene random copolymers, styrene-isoprene random copolymers, and hydrogenated products of these copolymers. The use of component (C) of the above-described type is effective for improving the compatibility between components (A) and (B).

In consideration of the resin strength attributable to improved compatibility, component (C) is blended in an amount of at least 1 part, preferably at least 2 parts, more preferably at least 3 parts by weight and up to 40 parts, preferably up to 30 parts, more preferably up to 20 parts by weight per 100 parts by weight of components (A) and (B) combined. Outside the range, the resin composition fails to endow the golf ball with sufficient rebound energy and durability.

According to the invention, (D) an epoxy-modified graft polymer comprising an olefin polymer backbone and vinyl polymer pendants is blended as an essential component. Component (D), especially when combined with component (C), serves to further improve the compatibility between components (A) and (B) and the flow of the resin composition, and thus essential to produce a molded part which is unsusceptible to cleavage or delamination and hence, a golf ball with very high durability.

The epoxy-modified graft polymers comprising an olefin polymer backbone and vinyl polymer pendants (D) include graft polymers having as the backbone an olefinic polymer which is prepared by copolymerizing ethylene or propylene alone or ethylene in combination with at least one members selected from among α-olefins (e.g., propylene and butene-1), vinyl esters (e.g., vinyl acetate and vinyl propionate), and acrylates or methacrylates (e.g., methyl, ethyl, propyl and butyl acrylates or methacrylates) with a glycidyl ester of an α,β-unsaturated acid such as glycidyl acrylate, glycidyl methacrylate, glycidyl ethacrylate and glycidyl itaconate; and as the pendant or side chain a vinyl polymer which is prepared from an aromatic vinyl monomer such as styrene, α-methylstyrene, vinyltoluene, p-methylstyrene, p-t-butylstyrene, o-ethylstyrene, and o,p-dichlorostyrene, a vinyl cyanide monomer such as acrylonitrile, methacrylonitrile, and ethacrylonitrile, or a (meth)acrylate monomer such as methyl methacrylate, ethyl methacrylate, propyl methacrylate, n-butyl methacrylate, isobutyl methacrylate, methyl acrylate, ethyl acrylate, isobutyl acrylate, n-butyl acrylate and 2-ethylhexyl acrylate. Of these, a graft polymer having glycidyl methacrylate copolymerized in the backbone is preferably used because it is effective for further improving the compatibility between components (A) and (B) for eventually providing a molded part with delamination resistance and a golf ball with high durability.

In consideration of the resin strength attributable to improved compatibility, component (D) is blended in an amount of at least 0.01 part, preferably at least 0.05 part, more preferably at least 0.1 part by weight and up to 10 parts, preferably up to 8 parts, more preferably up to 5 parts by weight per 100 parts by weight of components (A) and (B) combined. Below the range, the molded part is likely to delaminate, insufficient in rebound energy as golf balls, and less durable, with a failure to achieve an outstanding improvement in durability. Beyond the range, the resin composition is increased in melt viscosity and becomes somewhat difficult to injection mold.

In addition to the aforementioned components (A) to (D) as essential components, the golf ball-forming resin composition of the invention may further contain various additives as long as they do not compromise the objects of the invention. Exemplary additives include well-known antioxidants such as hindered phenol, phosphate, thioester and aromatic amine antioxidants, photo-stabilizers such as benzophenone, benzotriazole and hindered amine stabilizers, colorants such as pigments and dyes, antistatic agents, electric conductive agents, flame retardants, reinforcing agents, fillers, plasticizers, and parting agents.

The golf ball-forming resin composition of the invention is prepared by any desired method, for example, a method of melt mixing components (A) to (D) while adding various additives thereto if necessary. Exemplary specific methods are given below.

(1) The polyester block copolymer (A), the ionomer resin (B), the polyester-aromatic vinyl copolymer block copolymer (C) and the epoxy-modified graft polymer comprising an olefin polymer backbone and vinyl polymer pendants (D) are blended together, and the blend is fed to a screw extruder where it is melt mixed.

(2) The polyester block copolymer (A) is fed to a screw extruder where it is melted, then the ionomer resin (B), the polyester-aromatic vinyl copolymer block copolymer (C) and the epoxy-modified graft polymer comprising an olefin polymer backbone and vinyl polymer pendants (D) are fed to the screw extruder from another inlet where they are melt mixed.

(3) The ionomer resin (B) is fed to a screw extruder where it is melted, then the polyester block copolymer (A), the polyester-aromatic vinyl copolymer block copolymer (C) and the epoxy-modified graft polymer comprising an olefin polymer backbone and vinyl polymer pendants (D) are fed to the screw extruder from another inlet where they are melt mixed.

The golf ball-forming resin composition can be advantageously used as an injection molding material whereby a golf ball having flexibility, high rebound energy and good durability is obtainable. By optimizing the physical properties of the resin composition, the aforementioned performance factors of golf ball-forming resin compositions are further improved.

In the practice of the invention, the golf ball-forming resin composition should preferably have a Shore D hardness of at least 25, more preferably at least 30 and up to 70, more preferably up to 60, even more preferably up to 50, as measured according to ASTM D-2240. With this adjustment, the composition becomes a material having a relatively low hardness and suited for the manufacture of golf balls with improved feel upon impact.

Also the golf ball-forming resin composition should preferably have a high modulus of resilience of at least 40%, more preferably at least 50% and up to 90%, as measured according to British Standard Specification 903. With this adjustment, the composition becomes a material having high resilience and suited for the manufacture of golf balls with more distance. With a modulus of resilience below the range, the ball may have less desirable flight performance.

The golf ball of the invention is configured to include a molded part (preferably a hot molded part) of the golf ball-forming resin composition according to the invention. Since the molded part has toughness, flexural fatigue resistance, tear strength, and delamination resistance, the ball is highly durable against hits.

The golf ball of the invention has a hot molded part of the golf ball-forming resin composition according to the invention as a constituent component. The golf ball is merely required to include a part which is molded using the inventive resin composition as a core, intermediate layer, cover, one-piece golf ball or solid center (for wound golf balls) material. The inventive golf balls include one-piece golf balls, two-piece golf balls consisting of a core and a core, multi-piece solid golf balls in which the core is enclosed with an intermediate layer or cover consisting of two or more layers of thermoplastic resins or rubbery materials, and thread-wound golf balls.

In the manufacture of golf balls according to the invention, the golf ball-forming resin composition according to the invention is used and processed into any desired ball structure by traditional techniques. Since the golf ball-forming resin composition according to the invention is smoothly flowing and best suited for injection molding, the composition can be manufactured into a core or one-piece golf ball by injection molding, with the advantage of improved operation efficiency. Additionally, since the resin composition is easy to form a thin film, the composition can be formed into an intermediate layer or cover having any desired thickness, with increased feasibility to form a thin layer.

When the resin composition of the invention is used as a core or one-piece golf ball material, the composition can be further adjusted such that an object formed therefrom may have a size and weight according to the Rules of Golf. For example, an inert filler is used for specific gravity adjustment. Exemplary inert fillers include zinc oxide, barium sulfate, silica, calcium carbonate and zinc carbonate, with barium sulfate being most preferred. The amount of the filler blended may be determined as appropriate in accordance with the specific gravity of the core and cover, the weight specification of the ball, and other parameters. Though not critical, the amount of the filler is at least 10 parts, especially at least 15 parts by weight, and up to 60 parts, especially up to 30 parts by weight per 100 parts by weight of the inventive resin composition.

When a solid core is formed from the golf ball-forming resin composition of the invention, it usually has a diameter of at least 25.00 mm, especially at least 35.00 mm and up to 39.95 mm, especially up to 38.90 mm.

When a one-piece golf ball is formed from the golf ball-forming resin composition of the invention, it usually has a diameter of at least 42.60 mm, especially at least 42.65 mm and up to 42.75 mm, especially up to 42.70 mm.

When an intermediate layer of golf ball is formed from the golf ball-forming resin composition of the invention, it usually has a gage of at least 0.5 mm, preferably at least 1.0 mm, especially at least 1.4 mm and up to 3.0 mm, preferably up to 2.5 mm, especially up to 1.9 mm. Outside the range, a thicker intermediate layer may detract from rebound and hence, distance, whereas a thinner intermediate layer may fail to provide durability.

When a cover of golf ball is formed from the golf ball-forming resin composition of the invention, it usually has a gage of at least 0.5 mm, preferably at least 1.0 mm, especially at least 1.4 mm and up to 3.0 mm, preferably up to 2.5 mm, especially up to 1.9 mm. Outside the range, a thicker cover may detract from rebound and hence, distance, whereas a thinner cover may fail to provide durability.

As described above, the golf ball of the invention has a hot molded part of the golf ball-forming resin composition according to the invention as a constituent component. Among a variety of golf balls, a multi-piece solid golf ball comprising a core, an intermediate layer and a cover wherein the intermediate layer is formed of the golf ball-forming resin composition according to the invention is recommended because this construction can take most advantage of the golf ball-forming resin composition according to the invention so that the ball is endowed with very high durability, increased distance and a good feel on impact.

In the manufacture of the multi-piece solid golf ball according to the preferred embodiment of the invention, the materials of which the constituent components other than the intermediate layer are made are not critical. For example, the core material may be any of well-known core materials. It is noted that the inventive resin composition may be used as the core material and in this case, the inventive resin composition is used after it is tailored by compounding the above-mentioned additives therein.

The well-known core materials are typically rubber compositions comprising a base rubber, crosslinking agent, co-crosslinking agent, inert filler and the like. The base rubber used may be, for example, natural rubber and/or synthetic rubber. Preferred is 1,4-polybutadiene having a cis structure of at least 40%. If desired, other rubbers such as a natural rubber, polyisoprene rubber and styrene-butadiene rubber may be suitably blended into the polybutadiene.

Exemplary of the crosslinking agent are organic peroxides such as dicumyl peroxide and di-t-butyl peroxide. Of these, dicumyl peroxide is most preferred. It is advantageous for the amount of crosslinking agent to be at least 0.5 part, and especially at least 0.8 part by weight, and up to 3 parts, and especially up to 1.5 parts by weight, per 100 parts by weight of the base rubber.

The co-crosslinking agents used herein include metal salts of unsaturated fatty acids, preferably zinc, magnesium and calcium salts of $C_{3-8}$ unsaturated fatty acids (e.g., acrylic acid and methacrylic acid). Of these, zinc diacrylate and zinc dimethacrylate are most preferred. It is advantageous to include such a co-crosslinking agent in an amount of at least 24 parts, and preferably at least 28 parts by weight, and up to 38 parts, and preferably up to 34 parts by weight, per 100 parts by weight of the base rubber.

Examples of the inert filler include zinc oxide, barium sulfate, silica, calcium carbonate and zinc carbonate. Most often, zinc oxide is used. Although the amount of filler blended is determined in accordance with the specific gravity of the core and cover, the weight specification of the ball and the like, and is not critical, an appropriate amount is 10 to 60 parts by weight (as the total of fillers) per 100 parts by weight of the base rubber.

The core-forming composition is obtained by compounding the foregoing ingredients. In a typical procedure, the ingredients are compounded in an ordinary mixer such as a Banbury mixer or roll mill, then compression or injection molded in a core-forming mold. The molded composition is cured by heating at a sufficient temperature for the crosslinking agent and co-crosslinking agent to work (for example, about 130 to 170° C. where dicumyl peroxide and zinc diacrylate are used as the crosslinking agent and co-crosslinking agent, respectively).

The core of the multi-piece solid golf ball obtained by compounding the above ingredients and molding usually has a diameter of 29 to 40 mm.

When the intermediate layer is formed around the solid core, the golf ball-forming resin composition of the invention is used as the intermediate layer material. Specifically, after the solid core is placed in a mold which is commonly used in the golf ball molding art, the resin composition is compression or injection molded to form the intermediate layer therearound. Injection molding is especially advantageous for ease of operation.

In the golf ball of the invention, the intermediate layer formed of the inventive resin composition usually has a gage (radial thickness) of at least 0.5 mm, preferably at least 1.0 mm, more preferably at least 1.4 mm and up to 3.0 mm, preferably up to 2.5 mm, more preferably up to 1.9 mm. Outside the range, a thicker intermediate layer may detract from rebound and hence, distance, whereas a thinner intermediate layer may fail to provide durability.

The multi-piece solid golf ball of the invention is completed by forming the cover around the intermediate layer on the solid core in a well-known manner. The cover material used herein may be any of well-known ionomer resins, for example, Himilan 1554, 1557, 1601, 1605, 1706, 1855, 1856, AM7315, AM7316, AM7317 and AM7318 (all products of DuPont-Mitsui Polychemicals Co., Ltd.), as well as Surlyn 6320, 7930, 8120, 8945 and 9945 (all products of E.I. du Pont de Nemours).

In forming the cover, there may be used any of well-known techniques, preferably the same technique as used in the formation of the intermediate layer. Injection molding is especially advantageous for ease of operation.

In the multi-piece solid golf ball of the invention, the cover usually has a gage (radial thickness) of at least 0.5 mm, preferably at least 1.0 mm, more preferably at least 1.4 mm and up to 3.0 mm, preferably up to 2.5 mm, more preferably up to 1.9 mm. Outside the range, a thicker cover may detract from rebound and hence, distance, whereas a thinner cover may fail to provide durability.

Once the cover has been formed, finishing treatment such as deburring, pretreatment and painting may be carried out on the surface thereof by any technique used in the conventional golf ball manufacture.

The multi-piece solid golf ball having the intermediate layer formed of the golf ball-forming resin composition of the invention features excellent distance and feel and remains highly durable.

Independent of its type, the golf ball of the invention can be manufactured such as to have a diameter and weight which conform with the Rules of Golf. Most often, the ball is given a diameter of 42.65 to 42.75 mm and a weight of 45.0 to 45.5 g.

EXAMPLE

Examples of the invention and comparative examples are given below by way of illustration, and are not intended to limit the invention. All parts and percents are by weight except % for modulus of resilience.

Physical properties of resins and golf balls were measured as described below.

Resin's physical properties

Melting point:

Using a differential scanning calorimeter (DSC-910 by E.I. Dupont), the sample was heated in a nitrogen gas atmosphere at a rate of 10° C./min. The temperature of melting peak was recorded.

Melt flow rate (MFR):

Measured under a load of 2160 g according to ASTM D-1238.

Surface hardness:

Shore D hardness was measured according to ASTM D-2240.

Flexural rigidity:

Measured according to JIS K-7106.

Modulus of resilience:

Measured according to British Standard Specification 903.

Flexural fatigue resistance:

After resin pellets were dried at 80° C. for 5 hours, they were press molded at a temperature of 230° C. into a specimen of 2 mm thick and 20 mm wide. The specimen was subjected to 500,000 flexing cycles using a de Mattia machine under conditions: a temperature of 23° C., a chuck distance of 25 mm⇌5.6 mm, and a flexing frequency of 300 cycles/min. At the end of test, the length of cracks was measured. A specimen in which shorter cracks form indicates better durability against hits as a golf ball.

Tear strength:

Tear strength was measured according to ASTM D-624, using a type C die and a specimen of 2 mm thick. A higher tear strength indicates better durability against hits as a golf ball.

Golf ball's physical properties

Delamination:

After resin pellets were dried at 80° C. for 5 hours, they were injection molded at a temperature of 230° C. into a cylindrical part having a diameter of 10 mm and a height of 200 mm. The molded part was visually observed for inspecting any delamination on its surface.

Outer diameter:

The outer diameter (mm) of the core, intermediate layer-formed state and ball was measured.

Weight:

The weight (gram) of the core, intermediate layer-formed state and ball was measured.

Hardness:

The deflection (mm) under a load of 100 kg of the core, intermediate layer-formed state and ball was measured. A larger value indicates softness.

Distance:

Using a swing robot (True Temper Co.) equipped with a No. 1 Wood club, the ball was hit at a head speed (HS) of 35 m/s. Carry and total distance (m) were measured.

Durability Against Repetitive Hits

Using a swing robot (True Temper Co.) equipped with a No. 1 Wood club, the ball at a fixed point was hit at a head speed of 40 m/s. Durability is expressed by an index relative to 100 for the average number of hits until rupture of Comparative Example 9.

Manufacture of Golf Ball Core

A core-forming composition of the formulation shown in Table 1 was molded and vulcanized in a mold, obtaining a core having the shape and physical properties shown in Table 1.

TABLE 1

| | Core type | 1 |
|---|---|---|
| Formulation (pbw) | 1,4-cis-polybutadiene | 100 |
| | Zinc diacrylate | 24.4 |
| | Dicumyl peroxide | 1.2 |
| | Antioxidant | 0.2 |
| | Barium sulfate | 25.4 |
| | Zinc oxide | 5 |
| | Zinc salt of pentachlorothiophenol | 0.2 |
| Vulcanizing conditions | Temperature | 155° C. |
| | Time | 15 min |
| Core | Diameter | 35.2 mm |
| | Weight | 27.6 g |
| | Hardness | 4.3 mm |

Preparation of Polyester Block Copolymer (A-1)

A reactor equipped with a helical ribbon agitation blade was charged with 234 parts of terephthalic acid, 215 parts of 1,4-butane diol, and 723 parts of poly(tetramethylene oxide) glycol having a number average molecular weight of about 2,000 together with 2 parts of titanium tetrabutoxide. Esterification reaction was carried out by heating the contents at 190 to 225° C. for 3 hours while allowing water of reaction to flow out of the system.

To the reaction mixture was added 0.5 part of Irganox 1010 (Ciba Geigy, hindered phenol antioxidant). After the reactor was heated at 245° C., it was slowly evacuated over 40 minutes to a vacuum of 27 Pa. Under these conditions, polymerization was effected for 2 hours 50 minutes. The polymer thus obtained was drawn into water in strand form, which was chopped into pellets.

Preparation of Polyester Block Copolymer (A-2)

A reactor equipped with a helical ribbon agitation blade was charged with 406 parts of dimethyl terephthalate, 257 parts of 1,4-butane diol, and 576 parts of poly(tetramethylene oxide) glycol having a number average molecular weight of about 1,400 together with 1.5 parts of titanium tetrabutoxide and 3 parts of trimellitic anhydride. The contents were heated at 210° C. for 2.5 hours while allowing 95% of the theory of methanol to flow out of the system.

To the reaction mixture was added 0.75 part of Irganox 1010. After the reactor was heated at 245° C., it was slowly evacuated over 40 minutes to a vacuum of 27 Pa. Under these conditions, polymerization was effected for 2 hours 40 minutes. The polymer thus obtained was drawn into water in strand form, which was chopped into pellets.

The composition and physical properties of copolymers (A-1) and (A-2) are shown in Table 2. In the table, PTMG under the heading of "low-melting polymer segment" designates poly(tetramethylene oxide) glycol and the accompanying four-digit number designates a number average molecular weight.

TABLE 2

| | Low-melting polymer segment | | Physical properties of polyester block copolymer | | | | |
|---|---|---|---|---|---|---|---|
| Symbol | Type | Copolymerized amount, wt % | MP, °C. | MFR, g/10 min (measuring temperature) | Flexural rigidity, MPa | Modulus of resilience, % | Surface hardness, Shore D |
| A-1 | PTMG-2000 | 77 | 170 | 18 (220° C.) | 30 | 78 | 32 |
| A-2 | PTMG-1400 | 63 | 182 | 25 (220° C.) | 50 | 72 | 40 |

Ionomer Resin

The ionomer resins used in Examples and Comparative Examples are listed in Table 3. Note that "Himilan" is the trade name of ionomer resins of DuPont-Mitsui Polychemicals Co., Ltd. and "Surlyn" is the trade name of ionomer resins of E.I. du Pont de Nemours.

TABLE 3

| | | Ionomer resin | | | |
|---|---|---|---|---|---|
| Symbol | Type | Neutralization ion | MFR, g/10 min (measuring temperature) | Flexural rigidity, MPa | Surface hardness, Shore D |
| B-1 | Himilan 1605 | Na | 2.8 (190° C.) | 280 | 67 |
| B-2 | Himilan 1706 | Zn | 0.7 (190° C.) | 240 | 66 |
| B-3 | Surlyn 8220 | Na | 1.0 (190° C.) | 390 | 74 |
| B-4 | Himilan AM7315 | Zn | 1.2 (190° C.) | 350 | 70 |
| B-5 | Surlyn 8120 | Na | 1.0 (190° C.) | 55 | 46 |

Polyester-aromatic Vinyl Copolymer Block Copolymer

The polyester-aromatic vinyl copolymer block copolymer used in Examples is shown in Table 4.

TABLE 4

| Symbol | Polyester-aromatic vinyl copolymer block copolymer |
|---|---|
| C-1 | block copolymer of polybutylene terephthalate with hydrogenated styrene/isoprene block copolymer |

Epoxy-modified Graft Polymer Comprising Olefin Polymer Backbone and Vinyl Polymer Pendants The epoxy-modified graft polymer comprising an olefin polymer backbone and vinyl polymer pendants used in Examples is shown in Table 5.

TABLE 5

| Symbol | Epoxy-modified graft polymer comprising olefin polymer backbone and vinyl polymer pendants |
|---|---|
| D-1 | graft polymer having ethylene/glycidyl methacrylate copolymer as the backbone and acrylonitrile/styrene copolymer as the pendant |

Intermediate Layer-forming Resin Composition

Examples 1–10

Using a V-blender, polyester block copolymer (A-1) or (A-2) was blended with ionomer resin (B-1) to (B-5), polyester-aromatic vinyl copolymer block copolymer (C-1) and epoxy-modified graft polymer comprising an olefin polymer backbone and vinyl polymer pendants (D-1) were mixed in the proportion shown in Table 6. The blend was melt mixed at 240° C. in a twin-screw extruder having a triple flighted screw of 45 mm diameter and then pelletized, obtaining an intermediate layer-forming resin composition.

TABLE 6

| | Blending proportion | | | | | | | | |
|---|---|---|---|---|---|---|---|---|---|
| Intermediate layer-forming resin composition | (A) Polyester block copolymer | | (B) Ionomer resin | | | | | (C) Polyester-aromatic vinyl copolymer block copolymer | (D) Epoxy-modified graft polymer comprising olefin polymer backbone and vinyl polymer pendants |
| | A-1 | A-2 | B-1 | B-2 | B-3 | B-4 | B-5 | C-1 | D-1 |
| Example 1 | 70 | — | 30 | — | — | — | — | 15 | 0.5 |
| Example 2 | 50 | — | 50 | — | — | — | — | 15 | 0.5 |
| Example 3 | 30 | — | 70 | — | — | — | — | 15 | 0.5 |
| Example 4 | 50 | — | 25 | 25 | — | — | — | 5 | 2 |
| Example 5 | 50 | — | 25 | 25 | — | — | — | 10 | 1 |
| Example 6 | — | 70 | 30 | — | — | — | — | 10 | 0.5 |
| Example 7 | 50 | — | — | — | 25 | 25 | — | 15 | 1 |
| Example 8 | 50 | — | — | — | — | 35 | 15 | 15 | 2 |
| Example 9 | 90 | — | 5 | 5 | — | — | — | 5 | 1 |
| Example 10 | 10 | — | 45 | 45 | — | — | — | 10 | 2 |

Using the specimen formed from the pellets mentioned above, the melt flow rate (MRF), hardness, modulus of resilience, flexural fatigue resistance and tear strength were measured. The occurrence of delamination on the molded part surface was visually observed. The results are shown in Table 7.

TABLE 7

| | | | | | Intermediate layer-forming resin composition's physical properties | | |
|---|---|---|---|---|---|---|---|
| Intermediate layer-forming resin composition | MFR at 220° C., g/10 min | Shore D hardness | Flexural rigidity, MPa | Modulus of resilience, % | Flexural fatigue resistance (crack length), mm | Tear strength, kN/m | Delamination |
| Example 1 | 14 | 39 | 70 | 69 | 9 | 120 | no |
| Example 2 | 10 | 48 | 140 | 59 | 7 | 130 | no |
| Example 3 | 6 | 55 | 230 | 54 | 6 | 160 | no |
| Example 4 | 3 | 48 | 130 | 60 | 0 | 160 | no |
| Example 5 | 4 | 48 | 140 | 60 | 0 | 180 | no |
| Example 6 | 10 | 49 | 160 | 59 | 0 | 190 | no |
| Example 7 | 5 | 53 | 250 | 56 | 5 | 140 | no |
| Example 8 | 3 | 49 | 150 | 58 | 7 | 130 | no |
| Example 9 | 5 | 34 | 47 | 75 | 8 | 130 | no |
| Example 10 | 2 | 64 | 300 | 42 | 0 | 190 | no |

Intermediate Layer-forming Resin Composition

Comparative Examples 1–9

Intermediate layer-forming resin compositions were obtained as in Examples 1–10 by blending the components in the proportion shown in Table 8, melt mixing and then pelletizing.

TABLE 8

| | | | | | | Blending proportion | | | | |
|---|---|---|---|---|---|---|---|---|---|---|
| | | (A) Polyester block copolymer | | (B) Ionomer resin | | | | | (C) Polyester-aromatic vinyl copolymer block copolymer | (D) Epoxy-modified graft polymer comprising olefin polymer backbone and vinyl polymer pendants |
| Intermediate layer-forming resin composition | | A-1 | A-2 | B-1 | B-2 | B-3 | B-4 | B-5 | C-1 | D-1 |
| Comparative Example | 1 | 70 | — | 30 | — | — | — | — | 15 | — |
| | 2 | 50 | — | 50 | — | — | — | — | 15 | — |
| | 3 | 30 | — | 70 | — | — | — | — | 15 | — |
| | 4 | 70 | — | 30 | — | — | — | — | — | 0.5 |
| | 5 | 50 | — | 50 | — | — | — | — | — | 0.5 |
| | 6 | 30 | — | 70 | — | — | — | — | — | 0.5 |
| | 7 | 70 | — | 30 | — | — | — | — | — | — |
| | 8 | 50 | — | 50 | — | — | — | — | — | — |
| | 9 | 30 | — | 70 | — | — | — | — | — | — |

Using the specimen formed from the pellets mentioned above, the physical properties were measured as in Examples 1–10. The results are shown in Table 9.

TABLE 9

| | | | | | | Intermediate layer-forming resin composition's physical properties | | |
|---|---|---|---|---|---|---|---|---|
| Intermediate layer-forming resin composition | | MFR at 220° C., g/10 min | Shore D hardness | Flexural rigidity, MPa | Modulus of resilience, % | Flexural fatigue resistance (crack length), mm | Tear strength, kN/m | Delamination |
| Comparative Example | 1 | 21 | 39 | 70 | 69 | 15 | 100 | found |
| | 2 | 15 | 48 | 140 | 59 | 13 | 110 | found |
| | 3 | 9 | 55 | 230 | 54 | 12 | 130 | found |

TABLE 9-continued

Intermediate layer-forming resin composition's physical properties

| Intermediate layer-forming resin composition | MFR at 220° C., g/10 min | Shore D hardness | Flexural rigidity, MPa | Modulus of resilience, % | Flexural fatigue resistance (crack length), mm | Tear strength, kN/m | Delamination |
|---|---|---|---|---|---|---|---|
| 4 | 13 | 38 | 60 | 68 | 20 | 70 | found |
| 5 | 11 | 47 | 130 | 58 | ruptured | 80 | found |
| 6 | 5 | 54 | 210 | 53 | 20 | 90 | found |
| 7 | 23 | 37 | 50 | 67 | ruptured | 40 | found |
| 8 | 16 | 46 | 135 | 57 | ruptured | 40 | found |
| 9 | 10 | 53 | 200 | 52 | ruptured | 60 | found |

As seen from the above results, the intermediate layer-forming resin compositions of Examples within the scope of the invention possess excellent properties including flexibility and a very high modulus of resilience, excellent flexural fatigue resistance, and high tear strength, and lack delamination. In contrast, the intermediate layer-forming resin compositions of Comparative Examples are inferior in flexural fatigue resistance and tear strength, and develop delamination.

Next, three-piece golf balls as shown in Tables 10 and 11 were manufactured using the core of Table 1, the intermediate layer-forming resin compositions of Tables 6 and 8, and a cover stock, which was a mixture of ionomer resins (Himilan 1706:Himilan 1605=1:1), titanium dioxide, and magnesium stearate in a ratio of 96/3/1 (wt %), having a surface Shore D hardness of 67 and a flexural rigidity of 310 MPa.

The golf balls were evaluated by the above tests, with the results being shown in Tables 10 and 11.

TABLE 10

| | | Example | | | | | | | | | |
|---|---|---|---|---|---|---|---|---|---|---|---|
| | | 1 | 2 | 3 | 4 | 5 | 6 | 7 | 8 | 9 | 10 |
| Core | Type | 1 | 1 | 1 | 1 | 1 | 1 | 1 | 1 | 1 | 1 |
| | Outer diameter (mm) | 35.2 | 35.2 | 35.2 | 35.2 | 35.2 | 35.2 | 35.2 | 35.2 | 35.2 | 35.2 |
| | Weight (g) | 27.6 | 27.6 | 27.6 | 27.6 | 27.6 | 27.6 | 27.6 | 27.6 | 27.6 | 27.6 |
| | Hardness (mm) | 4.3 | 4.3 | 4.3 | 4.3 | 4.3 | 4.3 | 4.3 | 4.3 | 4.3 | 4.3 |
| Intermediate layer | Gage (mm) | 1.6 | 1.6 | 1.6 | 1.6 | 1.6 | 1.6 | 1.6 | 1.6 | 1.6 | 1.6 |
| Ball | Outer diameter (mm) | 42.7 | 42.7 | 42.7 | 42.7 | 42.7 | 42.7 | 42.7 | 42.7 | 42.7 | 42.7 |
| | Weight (g) | 45.2 | 45.1 | 45.1 | 45.1 | 45.1 | 45.2 | 45.1 | 45.1 | 45.3 | 45.0 |
| | Hardness (mm) | 3.2 | 3.0 | 2.8 | 3.1 | 3.0 | 2.9 | 2.9 | 3.0 | 3.4 | 2.7 |
| Flight performance @ HS35 | Carry (m) | 142.0 | 142.5 | 143.0 | 142.3 | 142.6 | 142.4 | 143.1 | 142.2 | 142.0 | 143.6 |
| | Total (m) | 155.5 | 155.6 | 155.7 | 155.6 | 155.6 | 155.5 | 156.7 | 156.0 | 155.2 | 156.3 |
| | Spin rate (rpm) | 3320 | 3450 | 3630 | 3420 | 3450 | 3500 | 3680 | 3460 | 3240 | 3680 |
| Durability against repetitive hits | | 260 | 300 | 340 | 270 | 300 | 260 | 340 | 320 | 260 | 370 |
| Feel | | Good | Good | Good | Good | Good | Good | Good | Good | Good | Good |

TABLE 11

| | | Comparative Example | | | | | | | | |
|---|---|---|---|---|---|---|---|---|---|---|
| | | 1 | 2 | 3 | 4 | 5 | 6 | 7 | 8 | 9 |
| Core | Type | 1 | 1 | 1 | 1 | 1 | 1 | 1 | 1 | 1 |
| | Outer diameter (mm) | 35.2 | 35.2 | 35.2 | 35.2 | 35.2 | 35.2 | 35.2 | 35.2 | 35.2 |
| | Weight (g) | 27.6 | 27.6 | 27.6 | 27.6 | 27.6 | 27.6 | 27.6 | 27.6 | 27.6 |
| | Hardness (mm) | 4.3 | 4.3 | 4.3 | 4.3 | 4.3 | 4.3 | 4.3 | 4.3 | 4.3 |
| Intermediate layer | Gage (mm) | 1.6 | 1.6 | 1.6 | 1.6 | 1.6 | 1.6 | 1.6 | 1.6 | 1.6 |
| Ball | Outer diameter (mm) | 42.7 | 42.7 | 42.7 | 42.7 | 42.7 | 42.7 | 42.7 | 42.7 | 42.7 |
| | Weight (g) | 45.2 | 45.1 | 45.1 | 45.1 | 45.1 | 45.2 | 45.2 | 45.1 | 45.1 |
| | Hardness (mm) | 3.2 | 3.0 | 2.8 | 3.1 | 3.0 | 2.9 | 3.4 | 3.2 | 3.0 |
| Flight performance | Carry (m) | 142.0 | 142.5 | 143.0 | 142.3 | 142.6 | 143.4 | 140.0 | 142.5 | 141.0 |
| | Total (m) | 155.5 | 155.6 | 155.7 | 155.6 | 155.7 | 155.8 | 153.5 | 153.7 | 153.8 |

TABLE 11-continued

| | Comparative Example | | | | | | | | |
|---|---|---|---|---|---|---|---|---|---|
| | 1 | 2 | 3 | 4 | 5 | 6 | 7 | 8 | 9 |
| @ HS35 Spin rate (rpm) | 3300 | 3460 | 3650 | 3310 | 3450 | 3640 | 3350 | 3510 | 3710 |
| Durability against repetitive hits | 175 | 200 | 225 | 100 | 130 | 150 | 55 | 80 | 100 |
| Feel | Good | Good | Good | Good | Good | Good | Good | Good | Good |

As seen from Examples 1 to 10, the golf balls having the intermediate layers formed of the resin compositions according to the invention exhibit a good balance of distance, feel and durability, and especially, superior durability to the golf balls of Comparative Examples. In contrast, the golf balls of Comparative Examples exhibit the requisite properties in not so good balance as in Examples, and especially, inferior durability.

According to the invention, a resin composition as formulated above has flexibility, resilience, toughness, flexural fatigue resistance and tear strength, exhibits a sufficiently smooth flow in the melt to injection mold, and develops no delamination when molded, and a golf ball comprising a molded part of the resin composition offers increased distance and pleasant feel upon impact and is endowed with superior durability.

Japanese Patent Application No. 2001-163336 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A golf ball comprising as a constituent component a part formed from a resin composition comprising:
   (A) 5 to 95% by weight of a polyester block copolymer comprising as main constituents (a1) high melting, crystalline polymer segments composed of crystalline aromatic polyester units and (a2) low melting polymer segments composed of aliphatic polyether units and/or aliphatic polyester units,
   (B) 95 to 5% by weight of an ionomer resin in the form of a copolymer comprising as main constituents (b1) an α-olefin and (b2) an α,β-unsaturated carboxylic acid having 3 to 8 carbon atoms, which is neutralized with (b3) at least one metal ion selected from among mono- to trivalent metal ions,
   the amount of components (A) and (B) combined being 100 parts by weight,
   (C) 1 to 40 parts by weight of a polyester-aromatic vinyl copolymer block copolymer comprising (c1) blocks of polyester and (c2) blocks of at least one type selected from among a block copolymer of an aromatic vinyl monomer with a conjugated diene, a random copolymer of an aromatic vinyl monomer with a conjugated diene, and hydrogenated products of these copolymers, and
   (D) 0.01 to 10 parts by weight of an epoxy-modified graft polymer comprising an olefin polymer backbone and vinyl polymer pendants.

2. The golf ball of claim 1 wherein component (B) is an ionomer resin in the form of a copolymer comprising as main constituents (b1) an α-olefin, (b2) an α,β-unsaturated carboxylic acid having 3 to 8 carbon atoms, and (b4) an acrylate and/or methacrylate, which is neutralized with (b3) at least one metal ion selected from among mono- to trivalent metal ions.

3. The golf ball of claim 1 wherein the polyester (c1) is an aromatic polyester.

4. The golf ball of claim 1 wherein the polyester (c1) is polybutylene terephthalate, and the copolymer (c2) is at least one member selected from among a styrene-butadiene block copolymer, a styrene-isoprene block copolymer, and hydrogenated products of these copolymers.

5. The golf ball of claim 1 wherein the epoxy-modified graft polymer (D) is a polymer modified with glycidyl methacrylate.

6. The golf ball of claim 1 wherein the high melting, crystalline polymer segments (a1) are composed mainly of polybutylene terephthalate units.

7. The golf ball of claim 1 wherein the low melting polymer segments (a2) are composed mainly of poly(tetramethylene oxide) glycol units.

8. The golf ball of claim 1 wherein the low melting polymer segments (a2) are copolymerized in an amount of 15 to 90% by weight of component (A).

9. The golf ball of claim 1 wherein the low melting polymer segments (a2) are copolymerized in an amount of 50 to 90% by weight of component (A).

10. The golf ball of claim 1 wherein the ionomer resin (B) comprises at least two ionomer resins neutralized with different metal ions.

11. The golf ball of claim 1 wherein the polyester block copolymer (A) has a flexural rigidity of 5 to 250 MPa as measured according to JIS K-7106, and the ionomer resin (B) has a flexural rigidity of 25 to 500 MPa as measured according to JIS K-7106,
   the copolymer (A) and the ionomer resin (B) have Shore D hardnesses as measured according to ASTM D-2240, the difference, expressed as the hardness of ionomer resin (B) minus the hardness of copolymer (A), is at least 10 units.

12. The golf ball of claim 1 wherein the part formed from the resin composition has a Shore D hardness of 25 to 70 as measured according to ASTM D-2240.

13. The golf ball of claim 1 wherein the part formed from the resin composition has a modulus of resilience of 40 to 90% as measured according to British Standard Specification 903.

14. The golf ball of claim 1 wherein the part formed from the resin composition has a Shore D hardness of 25 to 70 as measured according to ASTM D-2240 and a modulus of resilience of 40 to 90% as measured according to British Standard Specification 903.

15. A multi-piece solid golf ball comprising a core, an intermediate layer, and a cover wherein said intermediate layer is formed of the resin composition of claim 1.

* * * * *